(12) United States Patent
Carignano et al.

(10) Patent No.: US 6,514,567 B2
(45) Date of Patent: Feb. 4, 2003

(54) USE OF FLUORINATED COMPOUNDS TO CONFER RELEASE PROPERTIES

(75) Inventors: Gabriella Carignano, Milan (IT); Mattia De Dominicis, Padova (IT)

(73) Assignee: Ausimont S.p.A., Milan (IT)

(*) Notice: Subject to any disclaimer, the term of this patent is extended or adjusted under 35 U.S.C. 154(b) by 2 days.

(21) Appl. No.: 09/794,091

(22) Filed: Feb. 28, 2001

(65) Prior Publication Data

US 2001/0026843 A1 Oct. 4, 2001

(30) Foreign Application Priority Data

Feb. 29, 2000 (IT) .......................... MI00A0380

(51) Int. Cl.⁷ .............................. B05D 1/02; B05D 1/18; B05D 5/08
(52) U.S. Cl. ................. 427/391; 427/421; 427/439
(58) Field of Search ............................. 427/391, 421, 427/439

(56) References Cited

U.S. PATENT DOCUMENTS

| | | |
|---|---|---|
| 2,242,218 A | 5/1941 | Auer |
| 2,803,615 A | 8/1957 | Ahlbrecht et al. |
| 2,839,513 A | 6/1958 | Ahlbrecht et al. |
| 2,995,542 A | 8/1961 | Brown |
| 3,356,628 A | 12/1967 | Smith et al. |
| 3,536,749 A | 10/1970 | Groves |
| 3,665,041 A | 5/1972 | Sianesi et al. |
| 3,692,885 A | * 9/1972 | Anello et al. ............... 162/158 |
| 3,715,378 A | 2/1973 | Sianesi et al. |
| 3,810,874 A | 5/1974 | Mitsch et al. |
| 3,814,741 A | 6/1974 | Caporiccio et al. |
| 4,525,423 A | 6/1985 | Lynn et al. |
| 4,529,658 A | 7/1985 | Schwartz et al. |

FOREIGN PATENT DOCUMENTS

| | | | |
|---|---|---|---|
| DE | 2405042 | * | 8/1975 |
| EP | 0 148 482 A2 | | 7/1985 |
| EP | 0 239 123 A2 | | 9/1987 |
| EP | 0 608 780 A2 | | 8/1994 |
| EP | 0 622 653 A1 | | 11/1994 |
| EP | 0 870 778 A1 | | 10/1998 |
| JP | 60-064990 | * | 4/1985 |
| JP | 03-213595 | * | 9/1991 |

\* cited by examiner

Primary Examiner—Erma Cameron
(74) Attorney, Agent, or Firm—Arent Fox Kintner Plotkin & Kahn PLLC

(57) ABSTRACT

Use of fluorinated compounds to confer release properties to cellulosic substrata, selected from the following structures:

(A) $[R_f\!-\!CFY\!-\!L\!-\!O]_m P(O) (O^-Z^+)_{3-m}$ (B) $(O^-Z^+)_2 P(O)[O\!-\!L\!-\!YFC\!-\!O\!-\!R_f\!-\!CFY\!-\!L\!-\!O\!-\!P(O) (O^-Z^+)]_{m'}\!-\!\!-\![O\!-\!L\!-\!YFC\!-\!O\!-\!R_f\!-\!CFY\!-\!L\!-\!O]P(O) (O^-Z^+)_2$ (C) Fluorinated (meth)acrylic copolymers (D) $[R_t\!-\!CF_2\!-\!SO_2N(U_1)(U_2)\!-\!O]g\!-\!P(O)(OZ)_{3-g}$ wherein: m' is an integer from 0 to 20; L is an organic group selected from $-CH_2-(OCH_2CH_2)_n-$, $-CO-NR'-(CH_2)_q-$, with R'=H or $C_1-C_4$ alkyl group; n=0–8, q=1–8; Z=H, alkane metal or a $NR_4$ group with R=H or $C_1-C_4$ alkyl group; Y=F, $CF_3$; m=1,2,3;

Rf is a perfluoropolyether radical;

Rt is a linear or branched perfluorocarbon radical having from 1 to 20 carbon atoms; g=1–3; $U_1$, $U_2$ equal to or different from each other, are selected from linear or branched $C_1-C_8$ alkyl groups, $(CH_2CH_2O)_Q$ ethylenoxide groups, wherein $Q$ is in the range 1–20.

15 Claims, No Drawings

USE OF FLUORINATED COMPOUNDS TO CONFER RELEASE PROPERTIES

The present invention relates to compounds to confer release properties to cellulose supports.

Specifically, the invention relates to the treatment of cellulose supports, such as paper, cardboard, etc., with particular fluorinated derivatives such as to confer release properties. With "release" the capability of the treated surface to allow an easy manual release of adhesives, such as for example labels, is meant.

It is known in the prior art that labels are commercialized on paper supports treated with high amounts of silicone polymers to confer release properties which imply an easy manual release of the labels from the paper supports. In EP 608,780 a fluorosilicone composition is described which applied to the surface of various substrata, such as for example, paper, synthetic textiles, after a suitable thermal crosslinking treatment at high temperature, causes the formation of a film which confers to the paper release properties towards adhesive substances. The drawback of the use of the above mentioned fluorosilicone compositions resides in that they require an application process wherein the treating composition is applied to the substratum dissolved in an organic solvent. The commonly used organic solvents are aromatic, aliphatic and halogenated hydrocarbons, which are generally flammable and/or toxic liquids. These treatments cannot therefore be carried out on line, (directly in paper mill), but they require specific plants. A further drawback consists in that after the solvent evaporation, a crosslinking phase of the silicone polymer at high temperature, in the range 100–150° C., is necessary.

When aqueous silicone dispersions are used, the conferred release properties are worsened with respect to the case when the silicone dispersions are dissolved in an organic solvent.

The need was felt to have available products capable to confer improved release properties, applicable from completely aqueous formulations or aqueous formulations containing reduced amounts of co-solvent, with the maximum value of 10% with respect to water, without requiring a crosslinking phase at high temperature.

The Applicant has unexpectedly and surprisingly found specific compounds able to overcome the above mentioned drawbacks of the prior art, improving the release properties conferred to cellulose supports when said compounds are applied from aqueous or prevailingly aqueous formulations.

An object of the present invention are therefore fluorinated compounds and their use to confer release properties to cellulose substrata, said fluorinated compounds being selected from the following structures:

(A) $[R_f\text{—CFY—L—O}]_{m'}P(O)\ (O^-Z^+)_{3-m'}$ (B) $(O^-Z^+)_2P(O)\ [O\text{—L—YFC—O—}R_f\text{—CFY—L—O—P(O)}(O^-Z^+)]_{m'}\text{——}[O\text{—L—YFC—O—}R_f\text{—CFY—L—O}]P(O)\ (O^-Z^+)_2$ (C) Fluorinated (meth)acrylic copolymers (D) $[R_t\text{—CF}_2\text{—SO}_2N\ (U_1)\ (U_2)\text{—O}]g\text{—P(O)}\ (OZ)_{3-g}$ in the compounds of structure (A) and (B) the following definitions mean:

m' is an integer from 0 to 20, preferably from 0 to 4;

L is an organic group selected from —CH$_2$—(OCH$_2$CH$_2$)$_n$—, —CO—NR'—(CH$_2$)$_q$—, with R'=H or C$_1$–C$_4$ alkyl group;

n=0–8, preferably 1–3, q=1–8, preferably 1–3;

Z=H, alkane metal or a NR$_4$ group with R=H or C$_1$–C$_4$ alkyl group;

Y=F, CF$_3$;

m=1,2,3, preferably 1,2;

Rf has a number average molecular weight in the range 350–8,000, preferably 500–3,000 and it comprises repeating units having at least one of the following structures, statistically placed along the chain:

(CFXO), (CF$_2$CF$_2$O), (CF$_2$CF$_2$CF$_2$O), (CF$_2$CF$_2$CF$_2$CF$_2$O), (CR$_4$R$_5$CF$_2$CF$_2$O), (CF CF$_3$) CF$_2$O), (CF$_2$CF(CF$_3$)O), wherein

X=F, CF$_3$;

R$_4$ and R$_5$, equal to or different from each other, are selected from H, Cl, or perfluoroalkyl from 1 to 4 carbon atoms;

in the structure (D) the following definitions mean:

Rt is a linear or branched when possible perfluorocarbon radical having from 1 to 20 carbon atoms, preferably from 6 to 10 carbon atoms;

U$_1$, U$_2$ equal to or different from each other, are selected from linear or branched C$_1$–C$_8$ alkyl groups, (CH$_2$CH$_2$O)$_Q$ ethylenoxide groups, wherein $_Q$ is in the range 1–20, preferably 1–4;

g is an integer in the range 1–3.

Mixtures of two or more of the compounds (A), (B), (C) and (D) can also be used.

In particular Rf in the structures (A) and (B) can have one of the following structures:

1) —(CF$_2$O)$_{a'}$—(CF$_2$CF$_2$O)$_{b'}$— with a'/b' in the range 0.5–2, extremes included, a' and b' being integers such as to give the above mentioned molecular weight;

2) —(C$_3$F$_6$O)$_r$—(C$_2$F$_4$O)$_b$—(CFXO)$_t$— with r/b=0.5–2.0; (r+b)/t is in the range 10–30, b, r and t being integers such as to give the above mentioned molecular weight, X has the above mentioned meaning;

3) —(C$_3$F$_6$O)$_{r'}$—(CFXO)$_{t'}$— t' can be 0;

when t' is different from 0 then r'/t'=10–30, r' and t' being integers such as to give the above mentioned molecular weight; X has the above indicated meaning;

4) —(OCF$_2$CF(CF$_3$))$_z$—OCF$_2$(R'f)$_y$—CF$_2$O—(CF(CF$_3$)CF$_2$O)$_z$— wherein z is an integer such that the molecular weight is the above mentioned one;

y is an integer between 0 and 1 and R'f is a fluoroalkylene group having for example 1–4 carbon atoms;

5) —(OCF$_2$CF$_2$CR$_4$R$_5$)$_q$—OCF$_2$(R'f)$_y$—CF$_2$O—(CR$_4$R$_5$CF$_2$CF$_2$O)$_s$— wherein:

q and s are integers such that the molecular weight is the above mentioned one;

R$_4$, R$_5$, R'f, y have the above mentioned meaning;

6) —(C$_3$F$_6$O)$_{r'''}$(CFXO)$_{t'''}$—OCF$_2$(R'f)$_y$—CF$_2$O(CF(CF$_3$)CF$_2$O)$_{r'''}$(CFXO)$_{t'''}$— wherein r'''/t'''=10–30, r''' and t''' being integers such as to give the above mentioned molecular weight;

R'f and y having the above mentioned meaning.

In the above indicated formulas:

—(C$_3$F$_6$O)— can represent units of formula —(CF(CF$_3$)CF$_2$O)— and/or —(CF$_2$—CF (CF$_3$)O)—

In the structure (A) wherein Rf is monofunctional, the other end group is of the T—O— type, wherein T is a (per)-fluoroalkyl group selected from: —CF$_3$, —C$_2$F$_5$, —C$_3$F$_7$, —CF$_2$Cl, —C$_2$F$_4$Cl, —C$_3$F$_6$Cl; optionally one or two F atoms, preferably one, can be replaced by H.

Among the compounds of structure (A) the following compounds are already known for other applications:

m=2, Rf of structure 3) wherein t'=0, r'=1–8, Z=H, alkaline metals, optionally substituted ammonium ion, T=—C$_2$F$_5$, —C$_3$F$_7$;

m=1 and Rf having structure 1)–6), T=perfluorinated group optionally containing one chlorine atom.

The mentioned fluoropolyethers (A) and (B) are obtainable by the well known processes in the prior art, see for example the following patents herein incorporated by reference: U.S. Pat. Nos. 3,665,041, 2,242,218, 3,715,378, and EP 239123. The functionalized fluoropolyethers having hydroxyl termination are for example obtained according to EP 148482, U.S. Pat. No. 3,810,874.

The preparation of the monofunctional (per) fluoropolyether phosphates of structure (A) can be carried out by reacting the corresponding hydroxy-terminated (per) fluoroalkylenoxides with POCl$_3$. To obtain the monoester derivative (m=1) it is necessary to use a molar ratio POCl$_3$/hydroxy-terminated compound in the range 2/1–10/1, preferably 6/1–8/1. The reaction is carried out by slowly dropping the hydroxy-terminated compound in POCl$_3$, at a temperature between 50 and 100° C., preferably between 70° and 80° C., removing the HCl vapours in a KOH trap. The POCl$_3$ excess is removed by distillation while the formed adduct is hydrolysed by H$_2$O. The separation of the obtained product takes place by extraction with a suitable organic solvent, such as for example ethyl acetate. The product of structure (A) with m=1 is separated from the organic phase according to known techniques, for example by solvent evaporation.

To obtain the biester derivative (m=2) of formula (A) one proceeds as in the monoester case with the difference that after the POCl$_3$ removal, the reaction adduct is furtherly reacted with an equimolar amount of hydroxy-terminated compound. Subsequently hydrolysis is carried out and one proceeds as above described.

To obtain the triester derivative (m=3) of formula (A) one proceeds as in the monoester case with the difference that after the POCl$_3$ removal, the reaction adduct is furtherly reacted with a bimolar amount of hydroxy-terminated compound. Subsequently hydrolysis is carried out and one proceeds as above described.

The preparation of the bifunctional (per) fluoropolyether phosphates of structure (B) can be carried out by reacting the corresponding di-hydroxy-terminated (per) fluoroalkylenoxides with POCl$_3$. To obtain the derivative with m'=0, it is necessary to use a molar ratio POCl$_3$/di-hydroxy-terminated compound in the range 4/1–20/1, preferably 12/1–16/1. The reaction is carried out by slowly dropping the hydroxy-terminated compound in POCl$_3$, at a temperature between 50 and 100° C., preferably between 70° and 80° C., removing the HCl vapours in a KOH trap. The POCl$_3$ excess is removed by distillation while the formed adduct is hydrolysed by H$_2$O. The separation of the product (B) with m'=0 takes place by extraction with a suitable organic solvent, such as for example ethyl acetate. The product is separated from the organic phase according to known techniques, for example by solvent evaporation.

To obtain the product of structure (B) with m'>0, one proceeds as in the case m'=0 with the difference that after the POCl$_3$ removal, the reaction adduct is furtherly reacted with variable amounts of the di-hydroxy-terminated compound. Subsequently hydrolysis is carried out and the above described procedure is performed.

The compound (C) used in the present invention is formed by (meth)acrylic monomers comprising perf luoroalkyl groups having C$_3$–C$_{30}$ chain, linear or branched, or perfluoropolyether groups having chain from 4 to 30 carbon atoms; optionally one or more sulphonamide groups, hydrogenated (meth)acrylic monomers and cation and/or anion (meth) acrylic ionomer monomers.

As examples of these monomers reference is preferably made to the formulas (I), (II), (III) and (IV) reported hereunder, wherein the substituents have the mentioned meanings.

These fluoro(meth)acrylated copolymers are for example described in U.S. Pat. Nos. 2,803,615, 2,839,513, 2,995,542, 3,814,741, 3,356,628, 3,536,749, 4,525,423, 4,529,658, EP 622,653 and EP 870,778 as precursor acrylic monomers.

Said copolymers can be prepared for example by emulsion polymerization, in the presence of an emulsifier, catalyst and chain transfer agent as described for example in U.S. Pat. No. 4,525,423. For example the fluoroacrylated copolymers (C) can be obtained by using the following monomers in the indicated amounts:

a) from 1 to 30% by weight of monomers or monomer mixtures of formula

 (II)

wherein

R$^1$ is a C$_1$–C$_{20}$ alkyl, cycloalkyl, haloalkyl, halocycloalkyl group, (halo=Cl, Br);

R$^2$ is a C$_1$–C$_6$ alkylene or haloalkylene group, each group R$^2$ can be equal to or different from other R$^2$ groups, at least one R$^1$ or R$^2$ group contains one halogen atom, nII is an integer from zero to 10, with the proviso that when n is zero R$^1$ is a C$_1$–C$_{16}$ haloalkyl or halocycloalkyl group;

mII is zero or 1;

b) from 60 to 80% of monomers or monomer mixtures of formula

 (I)

wherein

R$_{fI}$ is a fluoroalkyl radical having C$_3$–C$_{30}$, preferably C$_3$–C$_{20}$, carbon atoms, or it is a perfluoropolyether radical PFPE containing the above mentioned units and having a number of carbon atoms in the range C$_5$–C$_{30}$;

pI is 1 or 2;

Q is a polyvalent binding bridge, C$_1$–C$_{12}$ divalent from 1 to 12 carbon atoms, or an aromatic radical C$_3$–C$_{12}$. Q can optionally contain heteroatoms as N, O, S, or carbonylimino, sulphonylimino or carbonyl groups; Q can be unsubstituted or it can contain halogen atoms, hydroxyl groups, C$_1$–C$_6$ alkyl radicals and preferably it does not contain double or triple bonds; preferably Q is —CH$_2$—, —C$_2$H$_4$—, —SO$_2$N(R$^5$)C$_2$H$_4$—, —SO$_2$N(R$^5$)CH$_2$CH(CH$_3$)—, —C$_2$H$_4$SO$_2$N(R$^5$)—C$_4$H$_8$—, R$^5$ is H or a C$_1$–C$_4$ alkyl group;

c) from 0 to 15%, preferably from 1 to 15% of monomers or monomer mixtures of formula

 (III)

wherein $R^3$ is H or methyl;

d) from 1 to 6% of cation and/or anion monomers, or mixtures thereof, of formula $$CH_2{=}C\,(R^4)Z_{IV}Y_{IV}X \qquad (IV)$$

wherein $R^4$ is H or methyl, the group $Z_{IV}$ has a carbonyl or aromatic group or one oxygen or sulphur atom directly bound to the vinylidene radical of the monomer; the group $Z_{IV}$ can be preferably selected from the following:

—COOCH$_2$CH(OH)CH$_2$—, —COO(CH$_2$)$_{kIV}$—, —CONH(CH$_2$)$_{kIV}$, wherein kIV is an integer from 2 to 6;

$Y_{IV}$ can be of the cation type $Y_{IV}^+$ and it is preferably selected from: (a) pyridinium ion, (b) $N^+(R^6)_3$ ion wherein each $R^6$ is independently H or a $C_1$–$C_4$ alkyl group, or two of any $R^6$ combine to form a $C_4$–$C_5$ alkylene group, or two of any $R^6$ are —(CH$_2$)$_2$— and combine with one oxygen atom to give the structure —(CH$_2$)$_2$—O—(CH$_2$)$_2$—, (c) phosphonium ions and (d) sulphonium ions; preferably $Y_{IV}^+$ is $N^+(R^6)_3$ wherein $R^6$ is as above defined;

X is of anion type $X^-$, when $Y_{IV}$ is of cation type and it is preferably an halide (Cl, Br, I) or an alkyl sulphate;

$Y_{IV}$ can be of anion type $Y_{IV}^-$ and it is preferably selected from carboxyl and sulphonic groups;

X is of cation type $X^+$, when $Y_{IV}$ is of anion type and it is preferably H, alkaline metal, ammonium, or cations deriving from primary and secondary amines;

e) from 0 to 20% of monomers containing at least a double bond, such as for example maleic anhydride, acrylonitrile, vinyl acetate, vinyl chloride, vinyl fluoride, vinyliden fluoride, vinyliden cyanide, vinyl chloroacetate, vinyl silicone, ethylene, styrene, alkyl styrenes, halogenated styrenes, methacrylonitrile, N-vinyl carbazole, vinyl pyridine, vinyl alkyl ethers, vinyl alkyl ketones, isoprene, butadiene, chloroprene, fluoroprene, and mixtures thereof.

The preferred monomers of group a) are the esters alkyl, cycloalkyl, haloalkyl, halocycloalkyl (halo=Cl, Br) from 1 to 20 carbon atoms of the acrylic or methacrylic acid.

The preferred monomers of group b) are those containing $C_4$–$C_{12}$ perfluoroalkyl chains, still more preferably containing the sulphonamide group, such as for example $C_8F_{17}SO_2N(CH_3)CH_2CH_2OCOCH{=}CH_2$; when $R_f$ is based on PFPE, $T'O(C_3F_6O)_{r'}(CF_2O)_{t'}CF_2CH_2OCH_2CH_2OCOC(CH_3){=}CH_2$ can be mentioned, wherein $T'$=$C_1$–$C_3$ perfluoroalkyl, optionally one or more F atoms of T', generally one F atom, are substituted by H and/or Cl; r' and t' as above defined.

The monomers usable in group b) can also have the structures corresponding to the general formula:

wherein T', a' and b' have the above defined meaning; q''' is an integer from 0 to 1, A is a bivalent radical, preferably of linear aliphatic type $(CH_2)_{m'0}$ wherein m'0 is an integer from 1 to 20, or (alkylen)cycloaliphatic, (alkylen)-aromatic type. The bivalent radical A can optionally contain heteroatoms in the ring or in the alkylene chain, or it can be both a linear and branched polyalkylenoxy chain, in particular containing repeating units of the $CH_2CH_2O$, $CH_2CH(CH_3)O$, $(CH_2)_3O$, $(CH_2)_4O$ type. A can also contain groups of amide, ester, ether, COO, sulphur, imine type; the number of carbon atoms of the cycloaliphatic compounds being from 3 to 20, for the aromatic ones from 5 to 20; the group A can also be a combination of the indicated types; the bond group of A with the perfluoromethylene group of the fluorinated chain can be for example: —C—, —O—, —CONR— (R is H, alkyl, cycloaliphatic or aromatic groups with less than 15 carbon atoms), —CO$_2$—, —COS—, —CO—, one heteroatom, or the triazinic, or the heterocyclic aromatic groups having 5 or 6 atoms containing 2 or more heteroatoms equal to or different from each other; $T_0$ is —COOCH$=$CH$_2$, —COOCH$_2$CH$=$CH$_2$.

The compound (C) used in the present invention is available on the market under the form of aqueous dispersions of fluoroacrylates, for example as Scotchgard®, Scotchban® by 3M.

The compounds of the invention are used in aqueous formulations, optionally in the presence of a co-solvent having a concentration lower than 10% by weight. The co-solvent is selected from aliphatic alcohols having from 1 to 6 carbon atoms; aliphatic glycols having from 2 to 8 carbon atoms, optionally having an esterified hydroxyl; ketones or esters having from 3 to 10 carbon atoms.

When the compounds of the invention are used alone in the application phase, the treating aqueous solution has a concentration in the range 0.1–30% by weight, preferably 1–10% by weight, and it is applied by the techniques mentioned below.

To obtain good release properties the amount of the applied compound for treated surface unit is in the range 0.01–10 g/m$^2$, preferably 0.1–2 g/m$^2$.

The preferred compounds of the invention are those having structure (B).

The described products having structure (A), (B), (C) and (D), preferably the compound of structure (B), are also usable as release additives of formulations for various applications in the manufacture of papers, for example special papers.

The compounds of the invention are for example usable as release additives of aqueous silicone emulsions in coating applications of papers in confectionery, where the release property of the paper with respect to the food is important or in the label field where the release property of the paper with respect to the glue is important.

Another example of application of the products of the invention relates to their use as release additives of acrylic or silicone thermoweldable aqueous dispersions. The paper at present used in packaging is often coupled with a polyethylene film which forms a barrier towards the absorption of oils and greases and at the same time it allows the paper thermoweldability to obtain bags of different size and shape. By the products of the invention, silicone or acrylic aqueous dispersions can directly be used in paper mill to obtain thermoweldable coatings which allow the paper recycle. In fact the invention products allow, when additived with the above mentioned thermoweldable coatings to avoid the tackiness thereof at room temperature while allowing to maintain the weldability features unchanged at a temperature in the range 100–170° C.

The compounds of the invention, when used as release additives, are used in a ratio by weight in the range 1:1–1:50, preferably 1:3–1:30, with respect to the hydrogenated and/or silicone and/or acrylic polymer.

The compositions containing the additives or the compounds of the invention as such show release properties and give coatings having stable release properties with respect to tacky substances, for example pressure-sensitive adhesives, for example of silicone or acrylic type.

The additived formulation can be applied by coating, dipping or spraying starting from aqueous solutions having a concentration in the range 1%–50% by weight, preferably 10–30% by weight. The amount of the additive applied for treated surface unit is the same as that utilized when compounds as such are used.

The following Examples are given for illustrative purposes of the invention and they are not limitative of the scope of the same.

EXAMPLES

Example 1

In this Example paper samples having a basis weight equal to 65 g/m$^2$ and 8×5 cm sizes, have been treated by an aqueous formulation having a concentration equal to 10% by weight which is a mixture of the structures reported hereunder:

1) $(NH_4O)_2(O)PO(C_2H_4O)_pCH_2CF_2O\,(C_2F_4O)_n(CF_2O)_m CF_2CH_2(OC_2H_4)_p$——$OP(O)\,(ONH_4)_2$

2) $[(NH_4O)_2(O)PO(C_2H_4O)_pCH_2CF_2O(C_2F_4O)_n (CF_2O)_m\,CF_2CH_2(OC_2H_4)_pO]_2$——$P(O)ONH_4$ wherein p=1–4, n=2–4, m=2–6.

The structure 2) represents about 40% by moles with respect to the 1) one.

The product application has been carried out at room temperature, placing on the edge of the paper samples the treating solution by syringe and subsequently uniformly spreading the product using a little aluminum bar. After the application, the paper samples are placed in a stove at the temperature of T=80° C. for 10 minutes so as to eliminate the absorbed water.

The evaluation of the given release properties is carried out by a test called "test release" described hereinafter: on the paper sample an adhesive tape (label) having 1×5 cm sizes is applied on which an uniform pressure is exerted by an aluminum weight equal to 70 grams. Such pressure is exerted for 5 minutes. After said time, the weight is removed and the force necessary for the release of the adhesive tape from the paper sample is measured by a dynamometer. For each sample at least three measurements have been carried out. The measured force is expressed in grams and the reported value represents the average value of the three tests.

The experimental data obtained by applying known amounts of the product (expressed in g/m$^2$) are described in Table 1, where for comparison the release force referred to the untreated paper sample is reported (first line):

TABLE 1

| Applied amount (g/m$^2$) | Release force (g) |
|---|---|
| — | 160 |
| 0.58 | 1.1 |
| 1.23 | 0.7 |
| 1.37 | 0.8 |
| 3.12 | 0 |

It is observed that a good label release is obtained also at a very low concentration of deposited product.

Example 2

The same paper samples described in Example 1 are treated with an aqueous formulation having a concentration equal to 10% by weight which is a mixture of the structures reported hereunder:

1) $(NH_4O)_2(O)PO(C_2H_4O)_pCH_2CF_2O(C_2F_4O)_n(CF_2O)_m CF_2CH_2\,(OC_2H_4)_p$——$OP(O)\,(ONH_4)_2$

2) $[(NH_4O)_2(O)PO(C_2H_4O)_pCH_2CF_2O(C_2F_4O)_n (CF_2O)_m\,CF_2CH_2(OC_2H_4)_pO]_2$——$P(O)ONH_4$ wherein p=1–4, n=2–4, m=2–6

The structure 2) represents about 10% by moles with respect to the 1) one.

The evaluation of the given release properties is carried out as described in Example 1. The results are reported in Table 2.

TABLE 2

| Applied amount (g/m$^2$) | Release force (g) |
|---|---|
| 0.88 | 1.25 |
| 2.12 | 0 |

Example 3

The same paper samples are treated likewise to what described in Example 1 with an aqueous formulation of a commercial fluoroacrylate SCOTCHBAN®FC866 (3M) having a dry product concentration equal to 10% by weight.

The evaluation of the given release properties is carried out as described in Example 1. The results are reported in Table 3.

TABLE 3

| Applied amount (g/m$^2$) | Release force (g) |
|---|---|
| 1.53 | 66.6 |
| 2.99 | 0.84 |

In this case an amount of product of about 3 g/m$^2$ is necessary to obtain good release properties.

Example 4

The same paper samples are treated likewise to what described in Example 1 with an aqueous formulation having a concentration equal to 10% by weight of the monofunctional perfluoropolyether phosphate having structure:

with p=2–5, n=1–4, m=1–3.

The evaluation of the given release properties is carried out as described in Example 1. The obtained results are reported in Table 4.

TABLE 4

| Applied amount (g/m$^2$) | Release force (g) |
|---|---|
| 0.4 | 5 |
| 1.53 | 2.2 |

Example 5

The same paper samples have been treated as described in Example 1, using an aqueous formulation of a commercial fluorinated phosphate SCOTCHBAN®FC807A (3M) at a concentrtion equal to 10% by weight.

The release test has been carried out under the same conditions described in Example 1. The obtained results are reported in Table 5.

TABLE 5

| Applied amount (g/m²) | Release force (g) |
|---|---|
| 1.73 | 19.2 |
| 2.57 | 0.8 |

Example 6 (comparative)

The same paper samples are treated with a formulation of a monofunctional perfluoropolyether polyethoxy having the structure reported below, at a concentration equal to 10% by weight.

$$Cl(C_3F_6O)_pCF_2C(O)NHC_3H_6(C_2H_4O)_{22}CH_3$$

The treatment of the paper and the evaluation of the given release properties have been carried out as described in Example 1. Table 6 shows the obtained results.

TABLE 6

| Applied amount (g/m²) | Release force (g) |
|---|---|
| 0.86 | 95 |
| 1.73 | 83 |
| 4.15 | 72 |

It is observed how, in this case, even with high amounts of the applied product (about 4 g/m²), good release properties are not given to the paper.

Example 7

An aqueous formulation containing 49% by weight of a hydrogenated acrylic polymer with thermoweldable properties (Crodacoat® 59-598 produced by CRODA) is additived to the aqueous solution of the ammonium salt of the bifunctional perfluoropolyether phosphate described in Example 1, so as to obtain final ratios by weight acrylic polymer/phosphate PFPE equal to 3:1; 9:1; 15:1 and 30:1. The total dry product concentration (acrylic polymer+phosphate PFPE) is equal to 30% by weight. Paper samples having a basis weight equal to 65 g/m² and 8×5 cm sizes, have been treated with the above described mixture so as to apply a final amount of product equal to 5 g/m².

The product application and the release test have been carried out under the same conditions described in Example 1. The applied amount of product has resulted equal to 5 g/m².

The obtained results are reported in Table 7, where, for comparison, the measured release force referred to the paper sample treated only with the aqueous formulation of the hydrogenated acrylic polymer (last line), is reported.

TABLE 7

| Used product | Ratio by weight | Release force (g) |
|---|---|---|
| Acrylic polymer/ phosphate PFPE | 3:1 | 1 |
| Acrylic polymer/ phosphate PFPE | 9:1 | 1 |
| Acrylic polymer/ phosphate PFPE | 15:1 | 2 |
| Acrylic polymer/ phosphate PFPE | 30:1 | 3 |
| Acrylic polymer | — | >200 |

Example 8

An aqueous formulation containing 49% by weight of a hydrogenated acrylic polymer with thermoweldable properties (Crodacoat®) is additived to the aqueous solution of the ammonium salt of the bifunctional perfluoropolyether phosphate of Example 2 under the same conditions described in Example 7. Paper samples are treated with the obtained mixture.

The product application and the release test have been carried out under the same conditions described in Example 1. The obtained results are reported in Table 8.

TABLE 8

| Used product | Ratio by weight | Release force (g) |
|---|---|---|
| Acrylic polymer/ phosphate PFPE | 3:1 | 5 |
| Acrylic polymer/ phosphate PFPE | 6:1 | 23 |
| Acrylic polymer/ phosphate PFPE | 9:1 | 28 |

Example 9

An aqueous formulation containing 49% by weight of a hydrogenated acrylic polymer with thermoweldable properties (Crodacoat®) is additived to the aqueous solution of the ammonium salt of the monofunctional perfluoropolyether phosphate described in Example 4 under the same conditions described in Example 7.

The product application and the release test have been carried out under the same conditions described in Example 1. The applied amount of the product has resulted equal to 5 g/m². The obtained results are reported in Table 9.

TABLE 9

| Acrylic polymer/ phosphate PFPE | Release force (g) |
|---|---|
| 3:1 | 43 |
| 9:1 | 45 |

What is claimed is:
1. A method of conferring release properties to cellulose substrata by the application of fluorinated compounds, said fluorinated compounds being selected from the following:

B) $(O^-Z^+)_2P(O)[O-L-YFC-O-R_f-CFY-L-O-P(O)(O^-Z^+)]_{m'}$—
—$[O-L-YFC-O-R_f-CFY-L-O]P(O)(O^-Z^+)_2$ wherein:

m' is an integer from 0 to 20;

L is an organic group selected from $-CH_2-(OCH_2CH_2)_n-$, $-CO-NR'-(CH_2)_q-$, with R'=H or $C_1-C_4$ alkyl group;

n=0–8;

q=1–8;

z=H, alkane metal or a $NR_4$ group with R=H or $C_1-C_4$ alkyl group;

Y=F, $CF_3$;

Rf has a number average molecular weight in the range 350–8,000, and it comprises repeating units having at least one of the following structures, statistically placed along the chain:

(CFXO), ($CF_2CF_2O$), ($CF_2CF_2CF_2O$), ($CF_2CF_2CF_2CF_2O$), ($CR_4R_5CF_2CF_2O$), ($CF(CF_3)CF_2O$), ($CF_2CF(CF_3)O$), wherein X=F, $CF_3$; $R_4$ and $R_5$, equal to or different from each other, are selected from H, Cl, or perfluoroalkyl from 1 to 4 carbon atoms.

2. The method according to claim 1, wherein Rf in structure (B) is selected from:

1) $-(CF_2O)_{a'}-(CF_2CF_2O)_{b'}-$ with a'/b' in the range 0.5–2, extremes included, a' and b' being integers such as to give the above mentioned molecular weight;

2) $-(C_3F_6O)_r-(C_2F_4O)_b-(CFXO)_t-$ with r/b=0.5–2.0; (r+b)/t is in the range 10–30, b, r and t being integers such as to give the above mentioned molecular weight, X has the above mentioned meaning;

3) $-(C_3F_6O)_{r'}-(CFXO)_{t'}-$ when t' is different from 0 then r'/t'=10–30;

r' and t' being integers such as to give the above mentioned molecular weight; X has the above indicated meaning;

4) $-(OCF_2CF(CF_3))_z-OCF_2(R'f)_y-CF_2O-(CF(CF_3)CF_2O)_z-$ wherein z is an integer such that the molecular weight is the above mentioned one;

y is an integer between 0 and 1 and R'f is a fluoroalkylene group having 1–4 carbon atoms;

5) $(OCF_2CF_2CR_4R_5)_q-OCF_2(R'f)_y-CF_2O-(CR_4R_5CF_2CF_2O)_s-$ wherein:

q and s are integers such that the molecular weight is the above mentioned one;

$R_4$, $R_5$, R'f, y have the above mentioned meaning;

6) $-(C_3F_6O)_{r'''}(CFXO)_{t'''}-OCF_2(R'f)_y-CF_2O(CF(CF_3)CF_2O)_{r'''}-(CFXO)_{t'''}-$ wherein r'''/t'''=10–30, r''' and t''' being integers such as to give the above mentioned molecular weight;

R'f and y having the above mentioned meaning.

3. The method according to claim 1, wherein the compounds are used in aqueous formulations, optionally in the presence of a co-solvent having a concentration lower than 10% by weight.

4. The method according to claim 3, wherein the co-solvent is selected from aliphatic alcohols having from 1 to 6 carbon atoms; aliphatic glycols having from 2 to 8 carbon atoms, optionally having an esterified hydroxyl; ketones or esters having from 3 to 10 carbon atoms.

5. The method according to claim 3, wherein the applied aqueous solution has a concentration in the range 0.1–30% by weight.

6. The method according to claim 1, wherein the amount of the applied compound for treated surface unit is in the range 0.01–10 g/m².

7. The method according to claim 1, wherein the applied compound has structure (B).

8. The method according to claim 1, wherein compound (B) is used as release additives for formulations in the paper manufacture.

9. The method according to claim 8, wherein the formulations for the paper manufacture are:

aqueous silicone emulsions for paper coating in confectionery field or in the label field;

thermoweldable acrylic or silicone aqueous dispersions in the packaging field.

10. The method according to claim 8, wherein the compounds are used in a ratio by weight in the range 1:1–1:50, with respect to the silicone and/or acrylic suspension.

11. The method according to claim 8, wherein the additived formulation is applied as aqueous solutions having a concentration in the range 1%–50% by weight.

12. The method according to claim 1, wherein the compounds as such or as additives are applied by coating, dipping or spraying.

13. The method according to claim 1, wherein m' is an integer from 1 to 4;

n is an integer from 1 to 3;

q is an integer from 1 to 3;

$R_f$ has a number average molecular weight in the range 500–3,000.

14. The method according to claim 5, wherein the applied aqueous solution has a concentration in the range 1–10% by weight.

15. The method according to claim 6, wherein the amount of the applied compound for treated surface unit is in the range 0.1–2.0 g/m².

* * * * *